UNITED STATES PATENT OFFICE.

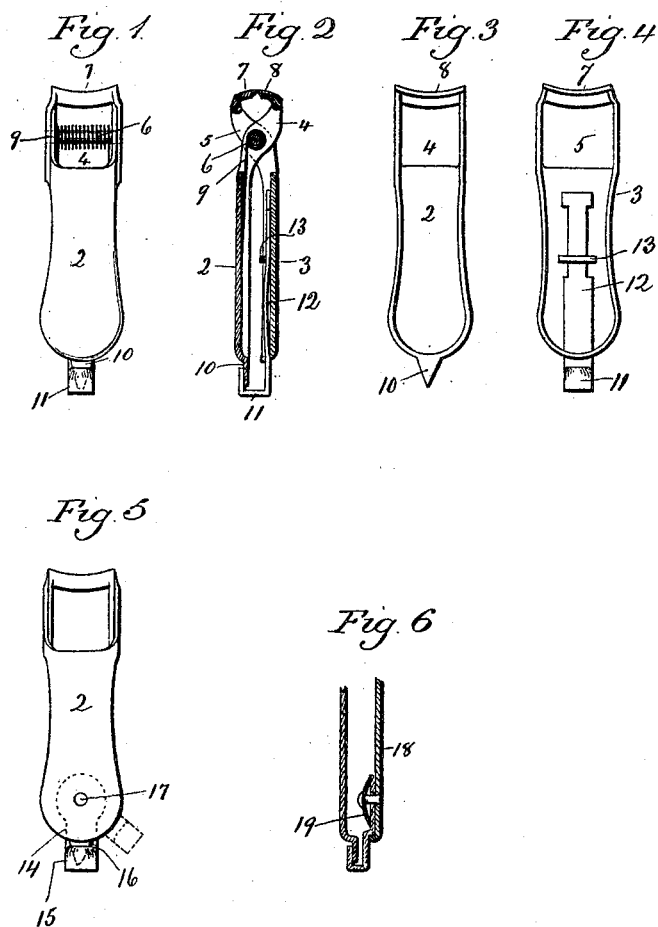

CHAPEL S. CARTER, OF ANSONIA, CONNECTICUT, ASSIGNOR TO THE H. C. COOK CO., OF ANSONIA, CONNECTICUT, A CORPORATION.

FINGER-NAIL TRIMMER.

No. 797,938.  Specification of Letters Patent.  Patented Aug. 22, 1905.

Application filed May 15, 1905. Serial No. 260,429.

*To all whom it may concern:*

Be it known that I, CHAPEL S. CARTER, a citizen of the United States, residing at Ansonia, in the county of New Haven and State of Connecticut, have invented a new and useful Improvement in Finger-Nail Trimmers; and I do hereby declare the following, when taken in connection with the accompanying drawings and the numerals of reference marked thereon, to be a full, clear, and exact description of the same, and which said drawings constitute part of this specification, and represent, in—

Figure 1, a plan view of one form which a plier-like finger-nail trimmer constructed in accordance with my invention may assume, the device being shown as closed; Fig. 2, a view thereof partly in side elevation and partly in longitudinal section, the device being shown as closed; Fig. 3, a detached view in inside elevation of the lever member having a finger extending outwardly from its handle end; Fig. 4, a corresponding view of the other lever member showing the locking-slide applied to it; Fig. 5, a plan view of one of the modified forms which the device may assume; Fig. 6, a broken view thereof in longitudinal section, showing the two lever members as locked together by a swinging lock.

My invention relates to an improvement in finger-nail trimmers of the plier type, the object being to produce a cheap, compact, effective, and durable article.

With these ends in view my invention consists in a finger-nail trimmer having certain details of construction and combinations of parts as will be hereinafter described, and pointed out in the claims.

In carrying out my invention as shown in Figs. 1 to 4, inclusive, I employ two struck-up sheet-metal lever members 2 and 3, respectively, formed with clearance-openings 4 and 5, adapting the two members to be combined plierwise and pivotally connected by a pivot 6, located relatively near their cutting edges 7 and 8. These lever members are flat in general form and cupped to increase their rigidity. For securing them together when not in use against the effort of a spiral operating-spring 9 to open them, this spring being applied to the pivot 6, I form the member 2 at its free or handle end with a rigid integral outwardly-extending finger 10, having the twofold function of a nail-cleaner and a locking-lug. This finger 10 is engaged by a rounded hook 11, located upon the free or handle end of a locking-slide 12, bowed to constitute a friction-spring and confined within the inner face of the lever member 3 by means of a clip 13. The friction developed by bowing the slide is sufficient to hold it in place. To open the device the hook 11 is grasped between the thumb and forefinger and pulled outward, so as to disengage it from the finger 10 and permit the spring 9 to act to separate the two levers. On the other hand, to close the device preparatory to returning it to the pocket, for instance, the two levers are pinched together between the thumb and forefinger until the finger 10 is brought within the range of the hook 11, which is then shoved inward over it, as shown by Fig. 2.

In the modified construction shown by Figs. 5 and 6 the locking-slide 12 is replaced by a swinging lock 14, formed at its outer end with a rounded hook 15, engaging with a tapering locking-finger 16, answering also as a nail-cleaner. The swinging lock 14 swings on a pivot-pin 17 in the lever member 18, under the control of the tension of a spring 19 in the form of a cupped disk. In operating this form of device the hook is swung away from and over the finger 16.

Having fully described my invention, what I claim as new, and desire to secure by Letters Patent, is—

1. In a finger-nail trimmer, the combination with two lever members pivoted together plierwise, one being provided upon its free or handle end with a rigid outwardly-extending locking-finger; of a movable fastening device applied to the other lever member for engagement with the said finger.

2. In a finger-nail trimmer, the combination with two lever members pivoted together plierwise, one being provided at its handle end with an outwardly-extending locking-finger; of a slide applied to the inner face of the other lever member and formed with a hook for engagement with the said locking-finger.

3. In a finger-nail trimmer, the combination with two lever members pivoted together plierwise, one being provided at its handle end with an outwardly-extending combined locking-lug and nail-cleaner; of a slide applied to the inner face of the other lever member and adapted to engage with the said combined part for locking the two lever members in their closed positions.

In testimony whereof I have signed this specification in the presence of two subscribing witnesses.

CHAPEL S. CARTER.

Witnesses:
    CLARA L. WEED,
    GEORGE D. SEYMOUR.